N. J. ENGH.
DRAW BAR COUPLING.
APPLICATION FILED JUNE 19, 1920.
1,362,857. Patented Dec. 21, 1920.
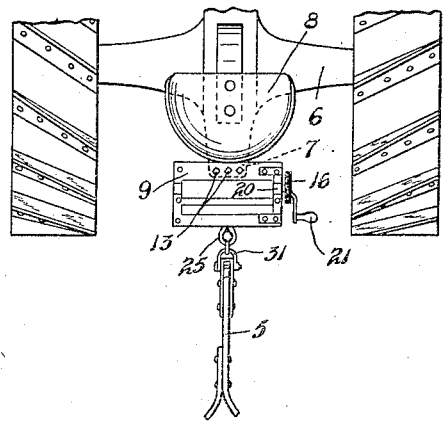
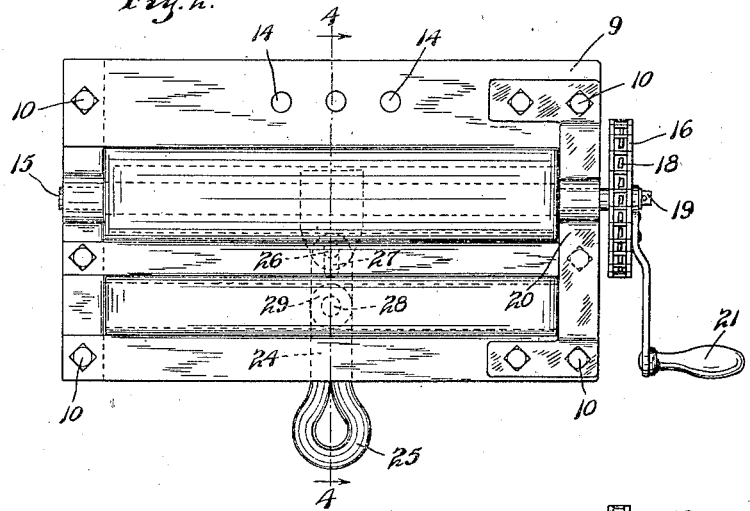
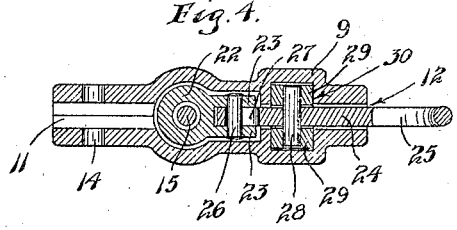
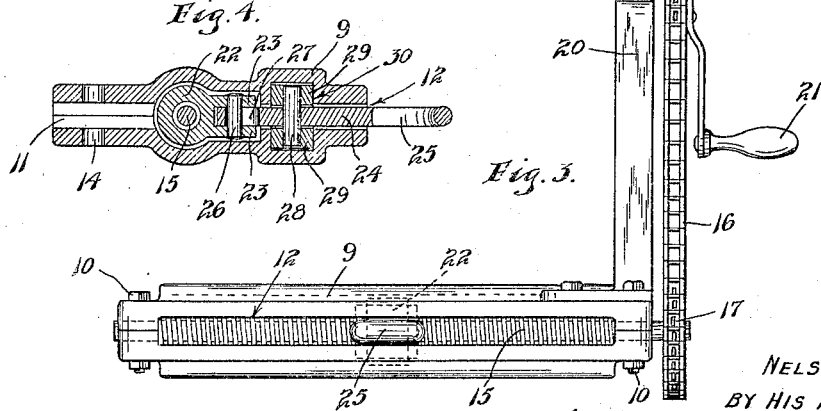
INVENTOR
NELS J. ENGH.
BY HIS ATTORNEYS.

UNITED STATES PATENT OFFICE.

NELS J. ENGH, OF ELKO, MINNESOTA.

DRAW-BAR COUPLING.

1,362,857.  Specification of Letters Patent.  Patented Dec. 21, 1920.

Application filed June 19, 1920. Serial No. 390,167.

*To all whom it may concern:*

Be it known that I, NELS J. ENGH, a citizen of the United States, residing at Elko, in the county of Scott and State of Minnesota, have invented certain new and useful Improvements in Draw-Bar Couplings; and I do hereby declare the following to be a full, clear, and exact description of the invention, such as will enable others skilled in the art to which it appertains to make and use the same.

My invention has for its object to provide an extremely simple and highly efficient drawbar coupler intended for general use, but especially adapted for use in connecting plow beams to tractors.

To the above end, the invention consists of the novel devices and combinations of devices hereinafter described and defined in the claims.

In the accompanying drawings, which illustrate the invention, like characters indicate like parts throughout the several views.

Referring to the drawings:—

Figure 1 is a plan view illustrating the beam of a plow attached to a tractor by means of the improved drawbar coupler;

Fig. 2 is a plan view of the drawbar coupler removed from the plow beam and tractor;

Fig. 3 is a rear elevation of the same; and

Fig. 4 is a view principally in section taken on the line 4—4 of Fig. 2.

The numeral 5 indicates the beam of a plow attached to a tractor by means of the improved drawbar coupler. Of the parts of the tractor illustrated, it is only necessary to illustrate the rear axle housing 6 having integrally formed therewith a stub drawbar 7 and a seat 8 secured to said rear axle housing.

The improved drawbar coupler includes a housing 9 comprising upper and lower sections rigidly but detachably connected by nut-equipped bolts 10. In the front edge portion of the housing 9 is a slot 11, and in the rear edge portion thereof is a slot 12, the former of which is adapted to receive the stub drawbar 7. The drawbar coupler is rigidly but detachably secured to the stub drawbar by a plurality of transversely spaced nut-equipped bolts 13, as shown three, passed through alined bores 14 in said stub drawbar and the upper and lower sections of the housing 9.

A transverse feed screw 15 is mounted in the housing 9 and has its ends journaled in coöperating half-seats formed in said housing and is held thereby against endwise movement. This feed screw 15 may be rotated in either direction by means of a sprocket chain 16 arranged to run over a sprocket 17 keyed to the right-hand end of the feed screw 15 outward of the housing 9, and a sprocket wheel 18 loosely journaled on a stud 19 secured in the upper end of a bracket 20 rigidly secured to the upper section of the housing 9 by certain of the bolts 10. A hand crank 21 is secured to the sprocket wheel 18 for turning the same. It is important to note that the hand crank 21 is conveniently located in respect to the seat 8, so that an operator sitting on said seat may operate said crank to turn the feed screw 15.

Mounted on the feed screw 15 is a transverse nut block 22 having a rearwardly projecting bifurcated lug 23 arranged to receive between the prongs thereof the forward ends of a link 24 having in its rear end a large eye 25. This link 24 is pivotally secured to the nut block lug 23 with freedom for limited endwise movement by means of a pin 26, which extends through a longitudinally extended slot 27 formed in said link and anchored at its ends in the prongs of the lug 23. To prevent any pulling strain on the feed screw 15 by the link 24, said link is provided at its intermediate portion with an upright pin 28, on the ends of which are journaled rollers 29 arranged to travel in channel tracks 30 formed in the upper and lower sections of the housing 9. A pair of interlocked clevises 31 detachably and flexibly connect the plow beam 5 to the link 24.

Under pulling strain, the rollers 29 will travel on the rear walls of the channel tracks 30, and under backing strain said rollers will travel on the forward walls of said channel tracks.

From the above description, it is evident that by operating the hand crank 21, the nut block 22 may be caused to travel on the feed screw 15 transversely of the tractor and thereby change the line of draft. The improved drawbar coupler is especially adapted for use when plowing in hilly country, where the line of draft must be changed from time to time. By means of the improved drawbar coupler, the operator may very easily and quickly change the line of draft without stopping the tractor or getting down from the seat. The feed screw 15 will, of course, hold the nut block 22 locked wherever set.

The line of draft may be further changed by shifting the housing 9 transversely on the stub drawbar 7, in which case it will be necessary to dispense with one of the bolts 13. The housing 9 not only affords a frame for the drawbar coupler, but protects the movable parts thereof from dust and dirt and will hold grease for lubricating said parts.

What I claim is:

1. A drawbar coupler comprising a frame having a track, a link having a roller mounted to travel on said track to take the pulling strain, a feed screw journaled in the frame and having a nut block, said link being pivoted to the nut block with freedom for a limited endwise movement, and means for operating the feed screw.

2. A drawbar coupler comprising a housing having upper and lower channel tracks, a link extending between the tracks and having rollers arranged to travel therein to take the pulling and backing strains, a feed screw journaled in the housing and having a nut block, said link being pivoted to the nut block with freedom for a limited endwise movement, and means for operating the feed screw.

3. A drawbar coupler comprising a housing having upper and lower channel tracks, a link extending between the tracks and having rollers arranged to travel therein, a feed screw journaled in the housing and having a nut block flexibly connected to the link, a bracket on the housing, a pair of alined sprocket wheels journaled the one on the feed screw and the other on the bracket, a sprocket chain arranged to run over the alined sprocket wheels, and means for operating the sprocket wheel on the bracket.

4. A drawbar coupler comprising a housing having upper and lower channel tracks, a link extending between the tracks and having rollers arranged to travel therein, a feed screw journaled in the housing and having a nut block, a slot and pin connection between the link and nut block, a bracket on the housing, a pair of alined sprocket wheels journaled the one on the feed screw and the other on the bracket, a sprocket chain arranged to run over the alined sprocket wheels, and means for operating the sprocket wheel on the bracket.

In testimony whereof I affix my signature in presence of two witnesses:

NELS J. ENGH.

Witnesses:
C. LERZINGER,
O. A. DOCKEE.